United States Patent [19]
Hamasaki

[11] Patent Number: 5,997,187
[45] Date of Patent: Dec. 7, 1999

[54] SHUTTER/DIAPHRAGM APPARATUS

[75] Inventor: Takuji Hamasaki, Tokyo, Japan

[73] Assignee: Asahi Kogaku Kogyo Kabushiki Kaisha, Tokyo, Japan

[21] Appl. No.: 08/925,144

[22] Filed: Sep. 8, 1997

[30] Foreign Application Priority Data

Sep. 10, 1996 [JP] Japan ............................ 8-262413

[51] Int. Cl.$^6$ ........................................... G03B 9/08
[52] U.S. Cl. .................. 396/449; 396/451; 396/458; 396/510
[58] Field of Search .................... 396/449, 451, 396/458, 460, 493, 494, 497, 505, 510

[56] References Cited

U.S. PATENT DOCUMENTS

| | | | |
|---|---|---|---|
| 2,949,076 | 8/1960 | Finkl | 396/510 |
| 4,199,247 | 4/1980 | Schwarz | 396/510 |
| 5,043,753 | 8/1991 | Nakamori | 396/449 |
| 5,072,249 | 12/1991 | Yoshida | 396/510 |
| 5,237,357 | 8/1993 | Morisawa | 396/449 |

Primary Examiner—A. A. Mathews
Attorney, Agent, or Firm—Greenblum & Bernstein, P.L.C.

[57] ABSTRACT

A shutter/diaphragm apparatus includes an intermediate plate between a diaphragm cam plate and a diaphragm rotating plate. A plurality of blades are provided between the diaphragm cam plate and the intermediate plate and between the diaphragm rotating plate and the intermediate plate. The blades are driven by a relative rotation between the diaphragm cam plate and the diaphragm rotating plate to vary the size of an aperture defined by the blades. The relative rotation can also completely close the aperture. The invention can also be applied to a diaphragm apparatus which has no shutter function.

14 Claims, 4 Drawing Sheets

SHUTTER/DIAPHRAGM APPARATUS

BACKGROUND OF THE INVENTION

1. Field of the Invention

The present invention relates to a shutter/diaphragm apparatus which serves not only as a shutter but also as a diaphragm (aperture stop) in a camera or the like.

2. Description of the Related Art

A shutter/diaphragm apparatus in which aperture blades can also be used as shutter blades is known in the art. In such a known shutter/diaphragm apparatus, a plurality of blades are provided between an annular diaphragm cam plate and a diaphragm rotation plate, so that a relative rotation between the cam plate and the rotation plate causes the blades to rotate or swing to vary the size of the aperture defined at a central portion of the blades (aperture-stop mechanism) or completely close the aperture (shutter mechanism).

In the above-mentioned known shutter/diaphragm apparatus, to make the shape of the aperture as circular as possible, not only must the number of blades be increased but also each blade must be elongated and smoothly curved in an arc-shape.

However, if the number of blades is increased, it is difficult to overlap the blades at the center of the aperture because the blades interfere with each other at the center of the aperture. Thus, the aperture does not completely close which is not acceptable in a shutter.

To solve this problem, a number of proposals have been made. For example, in Japanese Unexamined Patent Publication No. 4-133038 each blade is provided with an extension which is adapted to completely close the aperture.

However, in the above proposed system, if, for example, five or more elongated blades are partly overlapped, the distal end (end of the aperture side) of the uppermost blade interferes with the base end of the lowermost blade due to a possible deformation or deflection of the blades. Consequently, no appropriate shutter operation can be obtained or the blades may be damaged.

If the number of blades is restricted to provide an appropriate shutter operation, it is difficult to realize an approximately circular aperture as mentioned above, and the aperture is star-shaped or diamond-shaped. Thus, no appropriate diaphragm function can be obtained.

SUMMARY OF THE INVENTION

It is an object of the present invention to provide a reliable shutter/diaphragm apparatus in which a plurality of shutter/diaphragm blades can be stably controlled to obtain an approximately circular aperture (diaphragm function) and a perfect closure of the aperture (shutter function).

To achieve the object mentioned above, according to an aspect of the present invention, there is provided a shutter/diaphragm apparatus having a diaphragm cam plate, a diaphragm rotating plate and an intermediate plate. The diaphragm cam plate is provided with cam grooves and a center opening. The diaphragm rotating plate is provided with engaging holes and a center opening. The diaphragm rotating plate is rotatable relative to the diaphragm cam plate. The intermediate plate is provided with relief grooves corresponding to the cam grooves of the diaphragm cam plate. The intermediate plate is also provided with relief holes corresponding to the engaging holes of the diaphragm rotating plate, and with a center opening.

A plurality of shutter/diaphragm blades are provided to define a selected size of an aperture within the center openings of the diaphragm cam plate, the diaphragm rotating plate and the intermediate plate. The plurality of blades are also provided to close the center openings of the diaphragm cam plate, the diaphragm rotating plate and the intermediate plate. Each of the plurality of blades is provided with a pivot shaft and an operation shaft. The plurality of blades are separated into two groups, namely, a first group positioned between the diaphragm cam plate and the intermediate plate, and a second group positioned between the intermediate plate and the diaphragm rotating plate.

Preferably, the operation shafts of the blades of the first group are inserted into the cam grooves of the diaphragm cam plate. The pivot shafts of the blades of the first group are preferably inserted into the relief holes of the intermediate plate and the engaging holes of the diaphragm rotating plate. The operation shafts of the blades of the second group are inserted into the relief grooves of the intermediate plate and the cam grooves of the diaphragm cam plate. The pivot shafts of the blades of the second group are inserted into the engaging holes of the diaphragm rotating plate.

The diaphragm cam plate is preferably held so as not to rotate, while the diaphragm rotating plate is preferably rotatably supported, so that the diaphragm rotating plate can be rotated to move the blades. To achieve this end, the diaphragm rotating plate can be provided on an outer peripheral surface thereof with a gear which is adapted to rotate the diaphragm rotating plate.

Each of the blades is preferably provided with a base portion and a front end portion extending from the base portion. The pivot shafts and the operation shafts are provided on the base portions. Each of the blades is provided with a curved edge portion between the base and the front end portions, for defining the aperture.

The blades in each of the first and second groups are preferably spaced at an equi-angular distance in a circumferential direction of the diaphragm cam plate and the diaphragm rotating plate. More specifically, the blades of the first group are spaced at an equi-angular distance in the circumferential direction of the diaphragm cam plate. The blades of the second group are spaced at an equi-angular distance in the circumferential direction of the diaphragm rotating plate, respectively.

Preferably, the shape of each of the blades is identical, and the number of blades in the first group is the same as the number of blades in the second group.

The diaphragm cam plate, the intermediate plate and the diaphragm rotating plate are preferably arranged such that the axes of the center openings thereof are aligned on an optical axis of a photographing system of a camera to which the shutter/diaphragm apparatus is applied.

According to another aspect of the present invention, a shutter/diaphragm apparatus is provided having an intermediate plate provided between a diaphragm cam plate and a diaphragm rotating plate. A plurality of blades are provided between the diaphragm cam plate and the intermediate plate, and between the diaphragm rotating plate and the intermediate plate. The blades are rotated by a relative rotation between the diaphragm cam plate and the diaphragm rotating plate to control the size of an aperture defined by the blades, and to completely close the aperture.

In yet another aspect of the present invention, a shutter/diaphragm apparatus is provided having a diaphragm cam plate and a diaphragm rotating plate. Shutter/diaphragm blades are positioned between the plates so that the size of an aperture defined by the blades is varied and the aperture is completely closed by a relative rotation between the diaphragm cam plate and the diaphragm rotating plate. An intermediate plate is positioned between the diaphragm cam plate and the diaphragm rotating plate. The intermediate plate is arranged to divide the shutter/diaphragm blades into two groups. A first group is positioned between the diaphragm cam plate and the intermediate plate, and a second group is positioned between the intermediate plate and the diaphragm rotating plate. The intermediate plate can be rotated together with one of the diaphragm cam plate and the diaphragm rotating plate which is rotated.

The present invention can also be applied to a diaphragm apparatus which has no shutter function. In this embodiment, the plurality of shutter/diaphragm blades are used only to define a selected size of the aperture within said center openings of said diaphragm cam plate, said diaphragm rotating plate and the intermediate plate. Also, the blades are not used to close the center openings of the diaphragm cam plate, the diaphragm rotating plate and the intermediate plate.

The present disclosure relates to subject matter contained in Japanese Patent Application No. 8-262413 (filed on Sep. 10, 1996) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
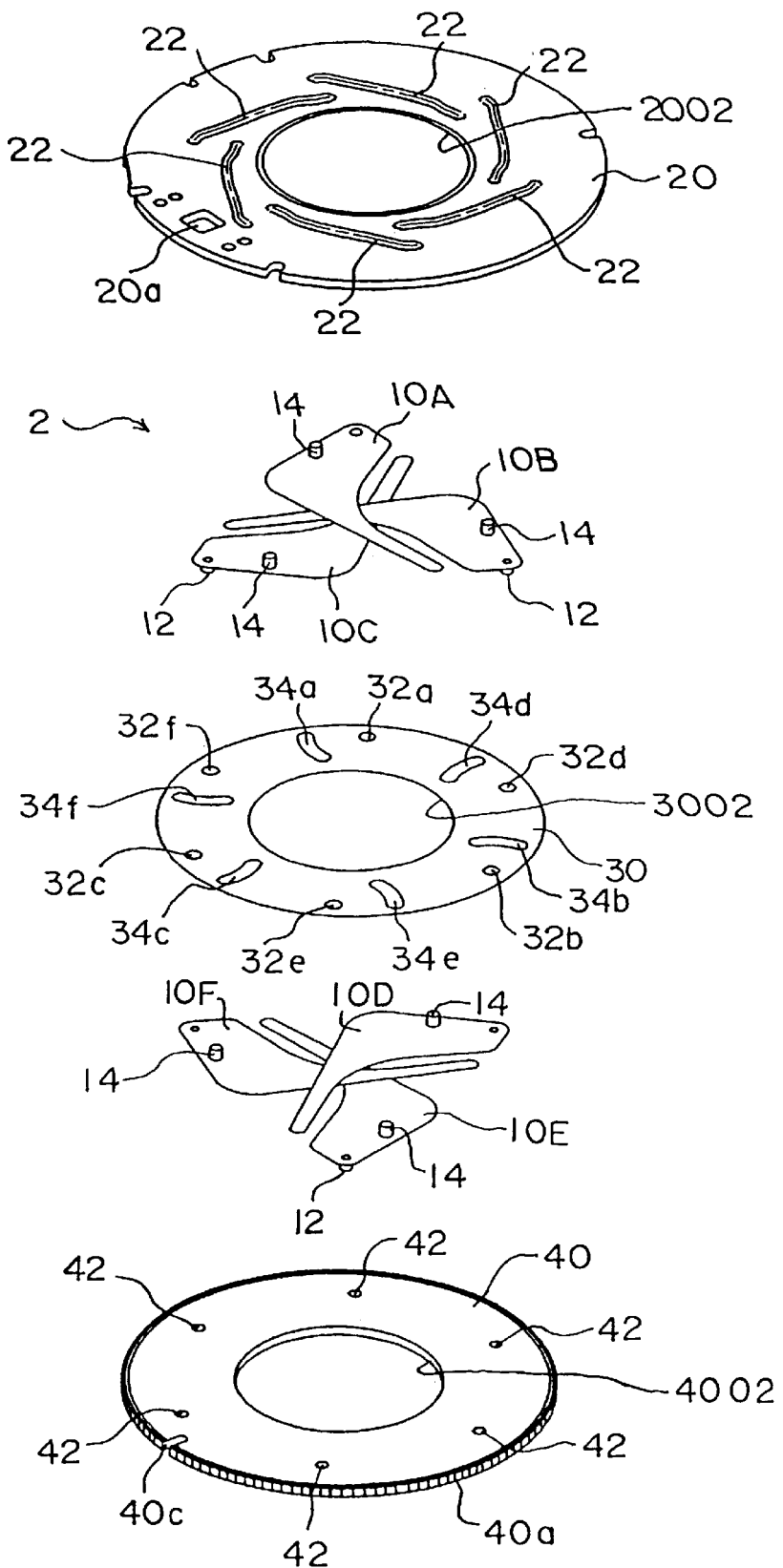
FIG. 1 is an exploded perspective view of a shutter/diaphragm apparatus according to the present invention.

In the illustrated embodiment as shown in FIG. 1, a shutter/diaphragm apparatus 2 consists of six blades 10A, 10B, 10C, 10D, 10E and 10F which serve as shutter blades as well as diaphragm blades. Also shown is an annular diaphragm cam plate 20, an annular diaphragm rotating plate 40 and an annular intermediate plate 30. The annular intermediate plate 30 is provided between the annular diaphragm cam plate 20 and the annular diaphragm rotating plate 40. The blades 10A through 10F have an identical shape and are made of, for example, a thin stainless steel plate. The shutter/diaphragm blades 10A through 10C are arranged between the diaphragm cam plate 20 and the intermediate plate 30, and the shutter/diaphragm blades 10D through 10F are arranged between the intermediate plate 30 and the diaphragm rotating plate 40.

The diaphragm cam plate 20, the diaphragm rotating plate 40 and the intermediate plate 30 are provided with central openings 2002, 4002 and 3002, respectively, and are arranged so that the central openings are coaxial.

Figure 3:
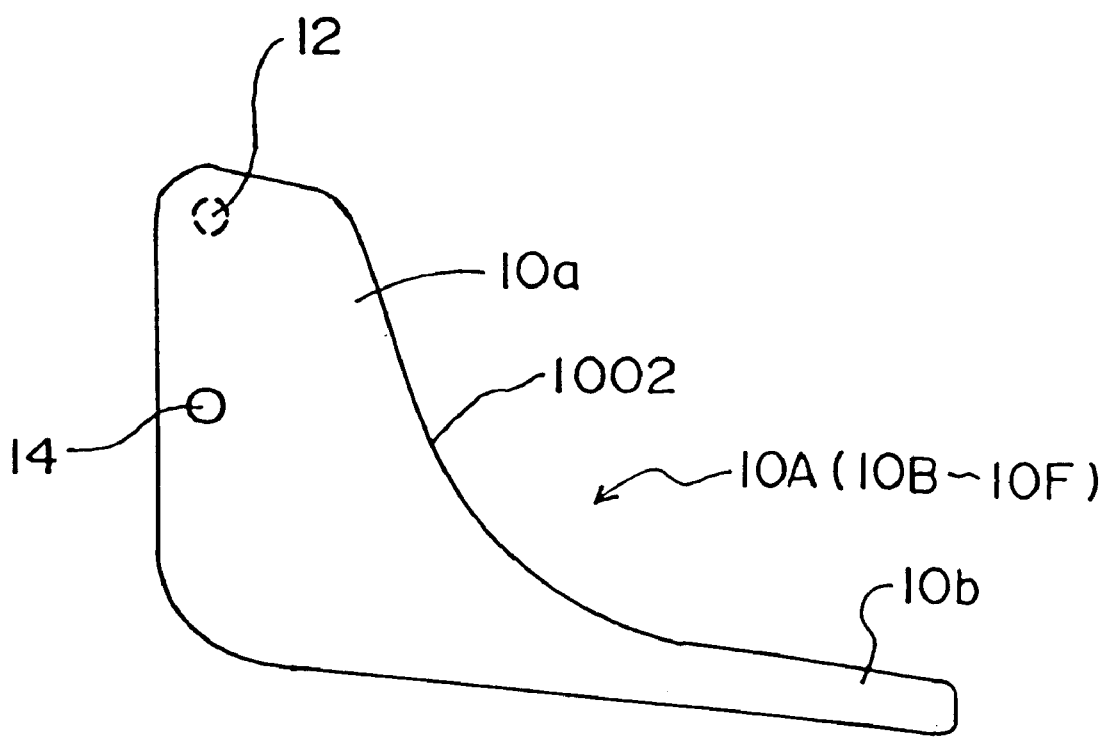
FIG. 3 is an enlarged plan view of a shutter/diaphragm blade used in the shutter/diaphragm apparatus shown in FIG. 1.

FIG. 3 shows one of the identical blades 10A through 10F. Each of the blades is integrally provided with a substantially rectangular and slightly rounded base portion 10a and an elongated distal end (front end) portion 10b which extends from one corner of the substantially rectangular base portion 10a.

Each of the blades 10A through 10F is provided on the inner peripheral side thereof with a smoothly curved edge portion 1002 which extends from the base portion 10a toward the front end portion 10b, so that the smoothly curved edge portions define an approximately circular aperture 10X (FIG. 2B) within the center openings 2002, 3002, and 4002 of the diaphragm cam plate 20, the intermediate plate 30, and the diaphragm rotating plate 40.

The blades 10A through 10F are provided with pivot shafts 12 projecting from the lower surfaces (as viewed in FIG. 1) of the base portions 10a and with operation shafts 14 projecting from the upper surfaces (as viewed in FIG. 1) of the base portions 10a. The pivot shafts 12 are rotatably fitted in engaging holes 42 formed in the diaphragm rotating plate 40 at an equi-angular distance of 60°. The operation shafts 14 are slidably fitted in cam grooves 22 formed in the diaphragm cam plate 20 at an equi-angular distance of 60°.

The pivot shafts 12 of the blades 10A through 10F are located at the corner portions of the base portions 10a, farthest from the front end portions 10b. The operation shafts 14 are located on the base portions 10a between the pivot shafts 12 and the front end portions 10b. Consequently, when a relative rotation occurs between the diaphragm cam plate 40 and the diaphragm rotating plate 20, the operation shafts 14 of the blades 10A through 10F are guided to slide in the cam grooves 22. Thus, the blades 10A through 10F rotate about the respective pivot shafts 12. Consequently, the front end portions 10b of the blades 10A through 10F are synchronously moved away from or towards the center portion of the aperture.

Note that the diaphragm rotating plate 40 is provided on the outer peripheral surface thereof with a gear 40a which is in mesh with a gear mechanism (described below) to control the rotation of the diaphragm rotating plate 40.

The three blades 10A through 10C provided between the diaphragm cam plate 20 and the intermediate plate 30 have a phase difference of 120°, and the three blades 10D through 10F provided between the diaphragm rotating plate 40 and the intermediate plate 30 have a phase difference of 120°.

The three blades 10A through 10C provided between the diaphragm cam plate 20 and the intermediate plate 30, and the three blades 10D through 10F provided between the intermediate plate 30 and the diaphragm rotating plate 40 are arranged in a complementary fashion in a plan view, so that the six blades 10A through 10F are spaced in the circumferential direction at an equi-angular distance of 60°.

The intermediate plate 30 is provided with insertion holes (relief holes) 32a through 32c through which the pivot shafts 12 of the blades 10A through 10C extend when the pivot shafts 12 are fitted in the engaging holes 42 of the diaphragm rotating plate 40. The intermediate plate 30 is also provided with elongated grooves (relief grooves) 34d through 34f in which the operation shafts 14 of the blades 10D through 10F are inserted when the operation shafts 14 are fitted in the cam grooves 22 of the cam plate 20. The length (width) of the elongated grooves (elongated holes) 34d through 34f is determined in accordance with the angular displacement of the operation shafts 14 and the profile of the cam grooves 22 so that the elongated grooves 34d through 34f do not interfere with the operation shafts 14.

Insertion holes 32d through 32f and elongated holes 34a through 34c function as follows.

Upon assembly, when the pivot shafts 12 of the blades 10A through 10C are inserted in the insertion holes 32a through 32c, the small projections (heads) of the pivot shafts 12 of the blades 10D through 10F slightly projecting from the upper surface of the blades 10D through 10F are received in the remaining insertion holes 32d through 32f, respectively. The six insertion holes 32a through 32f maintain balance during the rotational movement or facilitate the assembly operation, but nevertheless, the insertion holes 32d through 32f can be dispensed with if the projections of the pivot shafts 12 of the blades 10D through 10F toward the intermediate plate 30 are negligibly small.

Similarly, when the operation shafts 14 of the blades 10D through 10F are inserted in the elongated holes 34d through 34f, the small projections (heads) of the operation shafts 14 of the blades 10A through 10C slightly projecting from the lower surface of the blades 10A through 10C are received in the remaining elongated holes 34a through 34c, respectively. The six elongated grooves (holes) 34a through 34f maintain balance during the rotational movement or facilitate the assembly operation, but nevertheless, the elongated holes 34a through 34c can be dispensed with if the projections of the pivot shafts 14 of the blades 10A through 10C toward the intermediate plate 30 are negligibly small.

Note that the intermediate plate 30 is separate from the diaphragm rotating plate 40 but is rotatable together with the diaphragm rotating plate 40 through the pivot shafts 12.

Figure 2A:
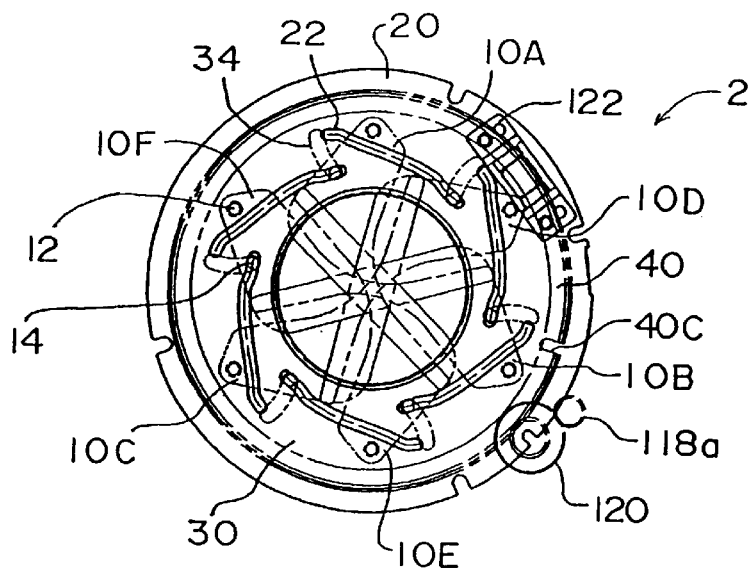
FIGS. 2A through 2C are plan views of a shutter/diaphragm apparatus shown in different open or closed positions.
Figure 2B:
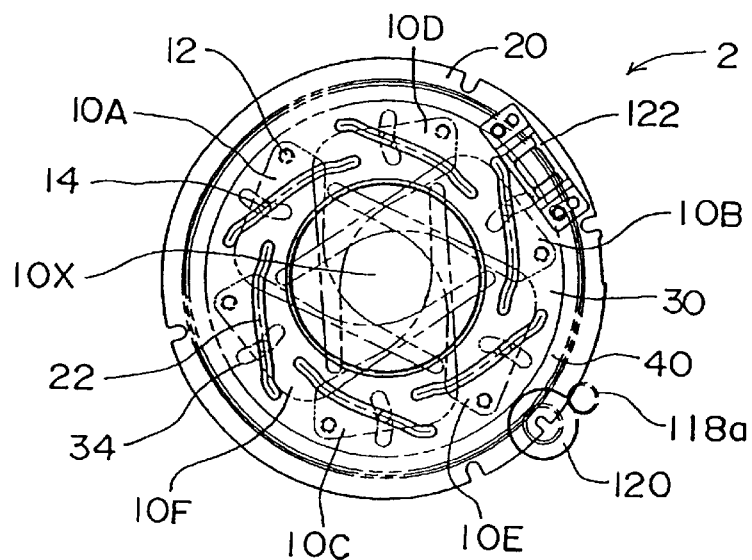
Figure 2C:
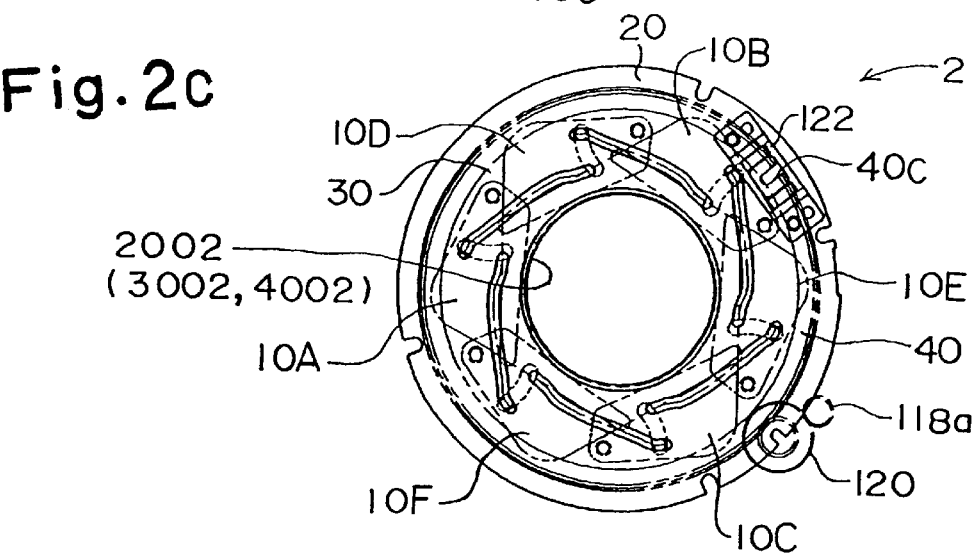

In the shutter/diaphragm apparatus having the structure mentioned above, when the relative rotation takes place between the diaphragm rotating plate 40 and the cam plate 20, the blades 10A through 10F form an aperture closed state as shown in FIG. 2A, an intermediate sized aperture state as shown in FIG. 2B, and an aperture fully opened state as shown in FIG. 2C. In the aperture closed state shown in FIG. 2A, the front end portions 10b of the blades 10A through 10F are moved toward the center of the aperture to close the aperture. In the intermediate sized aperture state shown in FIG. 2B, the front end portions 10b of the blades 10A through 10F are moved to an intermediate position to obtain an intermediate sized aperture 10X. In the aperture fully opened state shown in FIG. 2C, the blades 10A through 10F are completely retracted away from the center openings 2002, 3002 and 4002.

Further, in the shutter/diaphragm apparatus 2 of the present embodiment, since the six blades 10A through 10F are split by the intermediate plate 30, into two groups each having three blades, the three blades 10A through 10C or 10D through 10F in each group can be easily overlapped to establish a perfectly closed position in which the center of the aperture is closed. Thus, the six blades 10A through 10F function as shutter blades. Furthermore, in the shutter/diaphragm apparatus 2 according to the present embodiment, an approximately circular aperture 10X can be produced by the six blades 10A through 10F. Thus, the six blades also function as aperture blades.

Note that in FIGS. 2A and 2B, for the sake of clarity the elongated grooves (relief grooves) 34a through 34f are simply denoted by the reference numeral 34.

Figure 4:
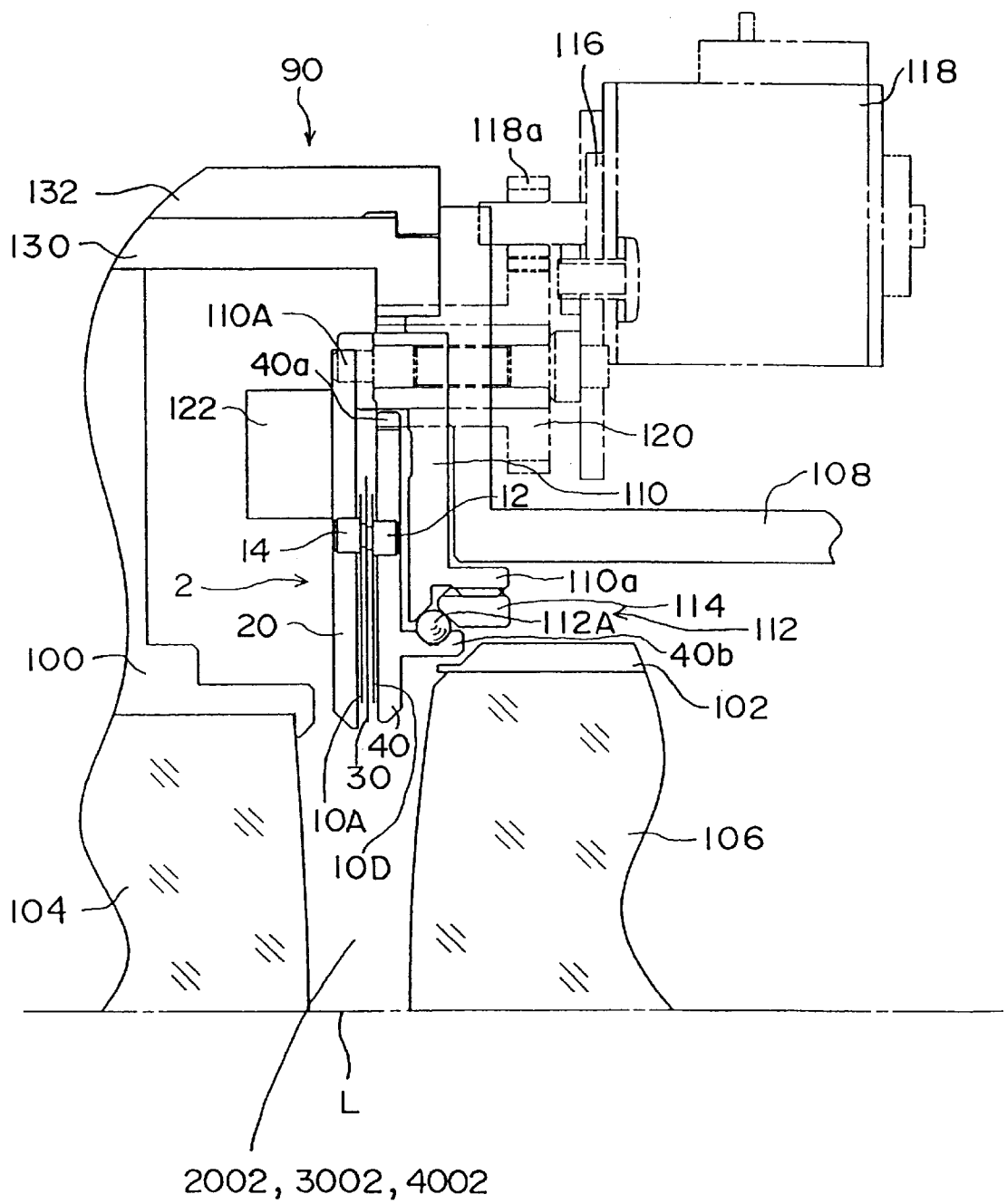
FIG. 4 is a sectional view of a mounting structure of a shutter/diaphragm apparatus in a camera, by way of example, according to the present invention.

FIG. 4 shows the shutter/diaphragm apparatus 2 incorporated in a camera. FIG. 4 is a sectional view of an upper half of a lens barrel 90 of a camera in which photographing lenses, etc., are housed. The shutter/diaphragm apparatus 2 is arranged between two photographing lens groups 104 and 106 which are held by lens frames 100 and 102, respectively. The cam plate 20, the diaphragm rotating plate 40 and the intermediate plate 30 are positioned so that the axes of the respective center openings 2002, 4002, and 3002 are aligned on an optical axis L of the photographing lenses.

Specifically, the diaphragm rotating plate 40 is rotatably mounted to a diaphragm securing ring 110 which is in turn mounted to a housing 108, through a ball bearing 112. The ball bearing 112 is provided with bearing balls 112A. The bearing balls 112A are retained between an annular flange 40b, provided on the surface of the diaphragm rotating plate 40, an inner peripheral edge portion 110a of the diaphragm securing ring 110, and a retainer ring 114.

A diaphragm motor 118 is mounted to the housing 108 through a motor mounting plate 116. Also, a diaphragm gear mechanism 120 is provided in the housing 108. Rotation of a pinion 118a of the diaphragm motor 118 is reduced by the diaphragm gear mechanism 120 and is transmitted to the gear 40a of the diaphragm rotating plate 40. Thus, the rotation of the diaphragm rotating plate 40 is controlled by the gear mechanism 120.

The diaphragm cam plate 20 is secured to the diaphragm securing ring 110 through pins 110A at a plurality of circumferentially spaced points. The diaphragm cam plate 20 is provided with a photo-reflector 122 which is adapted to detect a reference point for the rotational movement of the diaphragm rotating plate 40. Namely, as can be seen in FIG. 1, a detection recess 40c is formed on the diaphragm rotating plate 40 and detection light emitted from a light emitter of the photo-reflector 122 is directed toward the circumferential portion of the diaphragm rotating plate 40. Presence or absence of the detection light reflected from the diaphragm rotating plate 40 is detected by a light receiver of the photo-reflector 122, so that the position of the detection recess 40c is detected. The position of the detection recess 40c is used as a reference point for the rotational movement of the diaphragm rotating plate 40. Reference numerals 130 and 132 represent a stationary ring and a cam ring, respectively, which constitute the lens barrel 90.

The blades 10A through 10F and the intermediate plate 30 are arranged between the diaphragm rotating plate 40 and the diaphragm cam plate 20. Also, the pivot shafts 12 are fitted in the engaging holes 42 of the diaphragm rotating plate 40 and the operation shafts 14 are fitted in the cam grooves 22 of the diaphragm cam plate 20, respectively, as mentioned above. In FIG. 4 for reasons of clarity, blades 10A and 10D are shown on each side of the intermediate plate 30. In FIG. 4, the blades 10A through 10F are located in the fully opened position (fully retracted position).

When the diaphragm rotating plate 40 is rotated by the diaphragm motor 118, the blades 10A through 10F are moved from the fully opened position shown in FIG. 4 to reduce the size of the aperture. Consequently, the intermediate size of aperture 10X shown in FIG. 2B or the completely closed position shown in FIG. 2C can be obtained.

As can be understood from the foregoing, according to the present embodiment, the six blades 10A through 10F are split by the intermediate plate 30 into two blade groups, each having three blades, and hence the shutter function to completely close the aperture can be easily performed by the synchronized movement of the three identical blades in each blade group. Consequently, it is not necessary to provide shutter blades which are adapted only to completely close the aperture in addition to the aperture blades. The movement of the blades 10A through 10F between the fully opened position and the completely closed position can be controlled in a well balanced manner, resulting in a responsive, highly stable apparatus.

Moreover, since the three identical blades are provided on each side of the intermediate plate 30, a well balanced control can be carried out.

Because only three blades in each blade group overlap, the number of overlapping blades is reduced in comparison with the prior art in which all the blades (e.g., six blades) overlap. Thus, interference of the front ends of the blades will not occur in the present embodiment.

According to another aspect of the present embodiment, the superimposition structure of the three blades is simple, and adjacent blades serve as a guide for each other when the blades move, ensuring smooth movement of the blades. In addition to the foregoing, because the overlapping blades have a phase difference of 120°, the front ends of the blades do not lie across the base portions of other blades and are spaced. This is true even in the completely closed position in which the front ends of the blades are moved to the innermost position.

The overlapping arrangement of the three blades facilitates the assembling operation and makes an easy and precise adjustment possible. The smaller number of overlapping blades to contributes to an enhancement of the durability.

Because the aperture 10X is defined by the six blades, an approximately circular aperture can be obtained. Although three blades are provided on each side of the intermediate plate 30 in the illustrated embodiment, the number of blades is not limited to three and can be selected. For example, it is possible to provide four blades on each side of the intermediate plate. It is also possible to provide a different number of blades on opposed sides of the intermediate plate 30.

Although the diaphragm cam plate 20 is stationary and the diaphragm rotating plate 40 is rotatable in the illustrated embodiment, it is possible to provide a rotatable diaphragm cam plate and a stationary diaphragm rotating plate. Further, it is also possible to provide a rotatable diaphragm cam plate and a rotatable diaphragm rotating plate.

Although the illustrated embodiment is applied to a shutter/diaphragm apparatus for a camera, the present invention can be applied to a shutter/diaphragm apparatus for optical instruments other than a camera.

As may be understood from the above discussion, according to the present invention, the intermediate plate is provided between the diaphragm cam plate and the diaphragm rotating plate, and a plurality of blades are provided between the diaphragm cam plate and the intermediate plate and between the diaphragm rotating plate and the intermediate plate. Consequently, not only can an approximately circular aperture be easily obtained but also the aperture can be completely closed without interference between the blades. Moreover, the movement of the blades from the completely closed position to the fully opened position and vice versa can be controlled in a well balanced state. According to the present invention, the responsiveness and stability of the apparatus can be improved.

What is claimed is:

1. A shutter/diaphragm apparatus, comprising:
   a diaphragm cam plate which is provided with cam grooves and a center opening;
   a diaphragm rotating plate which is provided with engaging holes and a center opening, said diaphragm rotating plate being rotatable relative to said diaphragm cam plate;
   an intermediate plate which is provided with relief grooves corresponding to said cam grooves of said diaphragm cam plate, and with relief holes corresponding to said engaging holes of said diaphragm rotating plate, and with a center opening; and
   a plurality of shutter/diaphragm blades to define a selected size of an aperture within said center openings of said diaphragm cam plate, said diaphragm rotating plate and said intermediate plate, and to close said center openings of said diaphragm cam plate, said diaphragm rotating plate and said intermediate plate, each of said plurality of blades being provided with a pivot shaft and an operation shaft, said plurality of blades being separated into two groups, a first group positioned between said diaphragm cam plate and said intermediate plate, and a second group positioned between said intermediate plate and said diaphragm rotating plate,
   wherein said operation shafts of said blades of said first group are inserted into said cam grooves of said diaphragm cam plate, and said pivot shafts of said blades of said first group are inserted into said relief holes of said intermediate plate and said engaging holes of said diaphragm rotating plate,
   and further wherein said operation shafts of said blades of said second group are inserted into said relief grooves of said intermediate plate and said cam grooves of said diaphragm cam plate, and said pivot shafts of said blades of said second group are inserted into said engaging holes of said diaphragm rotating plate.

2. A shutter/diaphragm apparatus according to claim 1, wherein said diaphragm cam plate is held so as not to rotate, and said diaphragm rotating plate is rotatably supported, so that said diaphragm rotating plate can be rotated to move said blades.

3. A shutter/diaphragm apparatus according to claim 2, wherein said diaphragm rotating plate is provided on an outer peripheral surface thereof with a gear which is adapted to rotate said diaphragm rotating plate.

4. A shutter/diaphragm apparatus according to claim 1, wherein each of said blades is provided with a base portion and a front end portion extending from said base portion, said pivot shafts and said operation shafts being provided on said base portions, each of said blades being provided with a curved edge portion between said base portion and said front end portion, said aperture being defined by said curved edge portions of said blades.

5. A shutter/diaphragm apparatus according to claim 1, wherein said blades in each of said first and second groups are spaced at an equi-angular distance in a circumferential direction of said diaphragm cam plate and said diaphragm rotating plate.

6. A shutter/diaphragm apparatus according to claim 5, wherein said blades of said first group are spaced at said equi-angular distance in said circumferential direction of said diaphragm cam plate, and said blades of said second group are spaced at said equi-angular distance in said circumferential direction of said diaphragm rotating plate, respectively.

7. A shutter/diaphragm apparatus according to claim 1, wherein said blades are identical in shape.

8. A shutter/diaphragm apparatus according to claim 1, wherein the number of said blades of said first group is the same as the number of said blades of said second group.

9. A shutter/diaphragm apparatus according to claim 1, wherein said diaphragm cam plate, said intermediate plate and said diaphragm rotating plate are arranged such that the axes of said center openings thereof are aligned on an optical axis of a photographing system of a camera to which said shutter/diaphragm apparatus is applied.

10. A shutter/diaphragm apparatus, comprising:
    an intermediate plate provided between a diaphragm cam plate and a diaphragm rotating plate, one of the diaphragm cam plate and the diaphragm rotating plate being rotated, the intermediate plate being rotated together with the rotated one of the diaphragm cam plate and the diaphragm rotating plate; and a plurality of blades provided between said diaphragm cam plate and said intermediate plate, and between said diaphragm rotating plate and said intermediate plate, wherein said blades are rotated by a relative rotation between said diaphragm cam plate and said diaphragm rotating plate to control a size of an aperture defined by said blades and to completely close said aperture.

11. A shutter/diaphragm apparatus, comprising:

a diaphragm cam plate and a diaphragm rotating plate, one of the diaphragm cam plate and the diaphragm rotating plate being rotated, shutter/diaphragm blades positioned between the diaphragm cam plate and the diaphragm rotating plate so that a size of an aperture defined by said blades is varied and said aperture is completely closed by a relative rotation between said diaphragm cam plate and said diaphragm rotating plate; and an intermediate plate which is positioned between said diaphragm cam plate and said diaphragm rotating plate, the intermediate plate being rotated together with the one of the diaphragm cam plate and the diaphragm rotating plate that is rotated, said intermediate plate being arranged to divide said shutter/diaphragm blades into two groups, a first group positioned between said diaphragm cam plate and said intermediate plate, and a second group positioned between said intermediate plate and said diaphragm rotating plate.

12. A diaphragm apparatus comprising:

an intermediate plate provided between a diaphragm cam plate and a diaphragm rotating plate, one of the diaphragm cam plate and the diaphragm rotating plate being rotated, the intermediate plate being rotated together with one of the diaphragm cam plate and the diaphragm rotating plate that is rotated; and a plurality of blades provided between said diaphragm cam plate and said intermediate plate, and between said diaphragm plate and said intermediate plate, wherein said blades are rotated by a relative rotation between said diaphragm cam plate and said diaphragm rotating plate to control a size of an aperture defined by said blades.

13. A diaphragm apparatus comprising:

a diaphragm cam plate which is provided with cam grooves and a center opening;

a diaphragm rotating plate which is provided with engaging holes and a center opening, said diaphragm rotating plate being rotatable relative to said diaphragm cam plate;

an intermediate plate which is provided with relief grooves corresponding to said cam grooves of said diaphragm cam plate, and with relief holes corresponding to said engaging holes of said diaphragm rotating plate, and with a center opening; and a plurality of diaphragm blades to define a selected size of an aperture within said center openings of said diaphragm cam plate, said diaphragm rotating plate and said intermediate plate, each of said plurality of blades being provided with a pivot shaft and an operation shaft, said plurality of blades being separated into two groups, a first group positioned between said diaphragm cam plate and said intermediate plate, and a second group positioned between said intermediate plate and said diaphragm rotating plate, wherein said operation shafts of said blades of said first group are inserted into said cam grooves of said diaphragm cam plate, and said pivot shafts of said blades of said first group are inserted into said relief holes of said intermediate plate and said engaging holes of said diaphragm rotating plate, and further wherein said operation shafts of said blades of said second group are inserted into said relief grooves of said intermediate plate and said cam grooves of said diaphragm cam plate, and said pivot shafts of said blades of said second group are inserted into said engaging holes of said diaphragm rotating plate.

14. A diaphragm apparatus comprising:

a diaphragm cam plate and a diaphragm rotating plate, one of the diaphragm cam plate and the diaphragm rotating plate being rotated, diaphragm blades positioned between the diaphragm cam plate and the diaphragm rotating plate so that a size of an aperture defined by said diaphragm blades is varied by a relative rotation between said diaphragm cam plate and said diaphragm rotating plate; and an intermediate plate which is positioned between said diaphragm cam plate and said diaphragm rotating plate, the intermediate plate being rotated together with the rotated one of the diaphragm cam plate and the diaphragm rotating plate, said intermediate plate being positioned to divide said diaphragm blades into two groups, a first group positioned between said diaphragm cam plate and said intermediate plate, and a second group positioned between said intermediate plate and said diaphragm rotating plate.

* * * * *